United States Patent
Ho et al.

(10) Patent No.: US 7,778,631 B2
(45) Date of Patent: *Aug. 17, 2010

(54) SYNCHRONIZATION OF STORED SERVICE PARAMETERS IN A COMMUNICATION SYSTEM

(75) Inventors: Sai Yiu Duncan Ho, San Diego, CA (US); Edward G. Tiedemann, Jr., Concord, MA (US); Jun Wang, San Diego, CA (US); Ragulan Sinnarajah, San Diego, CA (US); Ramin Rezaiifar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 698 days.

This patent is subject to a terminal disclaimer.

(21) Appl. No.: 11/046,442

(22) Filed: Jan. 28, 2005

(65) Prior Publication Data

US 2005/0130708 A1   Jun. 16, 2005

Related U.S. Application Data

(62) Division of application No. 10/059,738, filed on Jan. 28, 2002, now Pat. No. 7,499,698.

(60) Provisional application No. 60/293,260, filed on May 23, 2001.

(51) Int. Cl.
*H04M 3/00* (2006.01)
(52) U.S. Cl. ...................................... 455/418
(58) Field of Classification Search ................ 455/418, 455/403, 453, 522, 78, 108, 150.1, 343, 161.1, 455/154.1, 192.2, 69, 3.03, 574, 561, 432.3, 455/435.1, 164.1, 450–452, 464, 13.4, 507–517, 455/434, 426; 370/311, 335, 342, 328–334, 370/441
See application file for complete search history.

(56) References Cited

U.S. PATENT DOCUMENTS 5,109,403 A   4/1992   Sutphin (Continued)

FOREIGN PATENT DOCUMENTS

JP   05284091   10/1993

(Continued)

OTHER PUBLICATIONS

3G TS 25.211 V3.2.0 (Mar. 2000) 3rd Generation Partnership Project: Technical Specification Group Radio Access Network; Physical Channels and mapping of transport channels onto physical channels (FDD) (Release 1999).

(Continued)

*Primary Examiner*—Melody Mehrpour
(74) *Attorney, Agent, or Firm*—Kam T. Tam

(57) ABSTRACT

Techniques for synchronization of stored service parameters are disclosed. In one aspect, a configuration identifier is transmitted from a mobile station to a base station, and compared with an identifier generated in the base station. If the identifiers match, the configuration is used for communication. In another aspect, the identifier is generated by selecting an identifier associated with a configuration from a configuration table. In yet another aspect, the identifier is generated by computing a cyclic redundancy check (CRC) of the configuration. Various other aspects are also presented. These aspects have the benefit of preventing attempted use of unsynchronized stored service parameters and associated call setup failures and subsequent renegotiation, with the net effect of reducing call setup time and more efficient use of system resources.

11 Claims, 6 Drawing Sheets

U.S. PATENT DOCUMENTS

| | | | |
|---|---|---|---|
| 5,479,654 | A | 12/1995 | Squibb |
| 6,085,349 | A | 7/2000 | Stein |
| 6,144,676 | A * | 11/2000 | Hamalainen et al. ........ 370/528 |
| 6,601,208 | B2 | 7/2003 | Wu |
| 6,639,954 | B2 | 10/2003 | Kuroiwa et al. |
| 6,665,834 | B2 | 12/2003 | Irvin et al. |
| 6,771,620 | B2 | 8/2004 | Butler |
| 7,010,321 | B2 | 3/2006 | Chi et al. |
| 7,047,031 | B2 | 5/2006 | Rosen et al. |
| 7,499,698 | B2 * | 3/2009 | Ho et al. .................... 455/418 |
| 2002/0004388 | A1 * | 1/2002 | Nakamichi .................. 455/422 |
| 2004/0259605 | A1 | 12/2004 | Quigley et al. |
| 2005/0159159 | A1 * | 7/2005 | Gureshnik et al. .......... 455/436 |

FOREIGN PATENT DOCUMENTS

| | | |
|---|---|---|
| JP | 09-074408 | 3/1997 |
| JP | 11-055242 | 2/1999 |
| JP | 11313371 | 11/1999 |
| JP | 2000-102072 | 4/2000 |
| WO | 00035107 | 6/2000 |
| WO | 01017283 | 3/2001 |

OTHER PUBLICATIONS

3G TS 25.212 V3.2.0 (Mar. 2000) 3rd Generation Partnership Project; Technical Specification Group Radio-Access Network: Multiplexing and channel coding (FDD) (Release 1999).

3G TS 25.213 V3.2.0 (Mar. 2000) 3rd Generation Partnership Project, Technical Specification Group Radio Access Network: Spreading and modulation (FDD) (Release 1999).

3G TS 25.214 V3.2.0 (Mar. 2000) 3rd Generation Partnership Project; Technical Specification Group Radio Access Network; Physical layer procedures (FDD) (Release 1999).

3GPP2 C.S0002-A, Physical Layer Standard for cdma2000 Spread Spectrum Systems, Release A, Version 6.0, Jun. 9, 2000.

3GPP2 C.S0005-A, Upper Layer (Layer 3) Signaling Standard for cdma2000 Spread Spectrum Systems—Release A, Jun. 9, 1999.

3GPP2 C.S0024, cdma2000 High Rate Packet Data Air Interface Specification, Version 3.0, Dec. 5, 2001.

TIA/EIA-95-B, Mobile Station-Base Station Compatibility Standard for Wideband Spread Spectrum Cellular Systems, Mar. 1999.

International Search Report—PCT/US02/016105, International Search Authority—European Patent Office, Oct. 18, 2002.

International Preliminary Examination Report—PCT/US02/016105, IPEA/US, Oct. 15, 2003.

3GPP2 C.S0005-A-1, Upper Layer (Layer 3) Signaling Standard for cdma2000 Spread Spectrum Systems—Release A, Addendum 1, Sep. 12, 2000, version 1.0, pp. 1-3.

* cited by examiner

SYNCHRONIZATION OF STORED SERVICE PARAMETERS IN A COMMUNICATION SYSTEM

CLAIM OF PRIORITY UNDER 35 U.S.C. §120

The present Application for Patent is a Divisional and claims priority to patent application Ser. No. 10/059,738 entitled "Synchronization of Stored Service Parameters in a Communication System" filed Jan. 28, 2002, now U.S. Pat. No. 7,499,698, which claims priority to Provisional Application No. 60/293,260 entitled "SYNC ID" filed May 23, 2001, and assigned to the assignee hereof and hereby expressly incorporated by reference herein.

FIELD

The present invention relates generally to communications, and more specifically to a novel and improved method and apparatus for synchronization of stored service parameters in a communication system.

BACKGROUND

Wireless communication systems are widely employed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Call setup is a procedure by which a mobile station and a base station establish communication. During call setup, various parameters may be negotiated, and other parameters may be directed by the base station without negotiation. These parameters are known as the service configuration record (SCR) and non-negotiable service configuration record (NNSCR), respectively. There may be a large number of parameters included in these records, and the time spent in negotiation and transfer of these parameters increases call setup time and uses system resources. Collectively these parameters and descriptors may be referred to as a configuration. Also, a set or subset of these parameters and/or descriptors may be referred to as a configuration. The exact makeup of a configuration may be specific to implementation, system, design and/or operation.

Release A of the cdma2000 standard provides for a procedure to minimize the time spent in call setup when parameters have been previously negotiated. A mobile station can store the mutually agreed to service configuration when it releases all dedicated channels and returns to the idle state. A mobile station may then attempt to reestablish a connection, whether initiating a new voice call or re-connecting a dormant data communication session. The mobile station sends an indication to the base station that a configuration has been stored and may still be useful for the new session. The mobile station sends an identifier for identifying the stored configuration, known in the cdma2000 standard as SYNC_ID. The SYNC_ID can be transmitted in an Origination Message, for a mobile station originated call, or a Page Response Message, for a mobile station terminated call. In response, the base station may instruct the mobile station, via a Service Connect Message, after dedicated channels have been established, that the mobile station should use the stored configuration. If so, the need for performing service negotiation is eliminated and the call setup time is reduced.

For this procedure to succeed, the stored service configuration must be identical at the mobile and base stations. In other words, the stored service configuration should be synchronized. If the mobile station and the base station attempt to use unsynchronized stored service configurations, the communication will fail, requiring additional system access attempts and subsequent renegotiation of parameters, thus actually increasing call setup time. There is therefore a need in the art for synchronization of stored service parameters.

SUMMARY

Embodiments disclosed herein address the need for synchronization of stored service parameters. In one aspect, a configuration identifier is transmitted from a mobile station to a base station, and compared with an identifier generated in the base station. If the identifiers match, the configuration is used for communication. In another aspect, the identifier is generated by selecting an identifier associated with a configuration from a configuration table. In yet another aspect, the identifier is generated by computing a Cyclic Redundancy Check (CRC) of the configuration. Various other aspects are also presented. These aspects have the benefit of preventing attempted use of unsynchronized stored service parameters and associated call setup failures and subsequent renegotiation, with the net effect of reducing call setup time and more efficient use of system resources.

DETAILED DESCRIPTION

Figure 1:
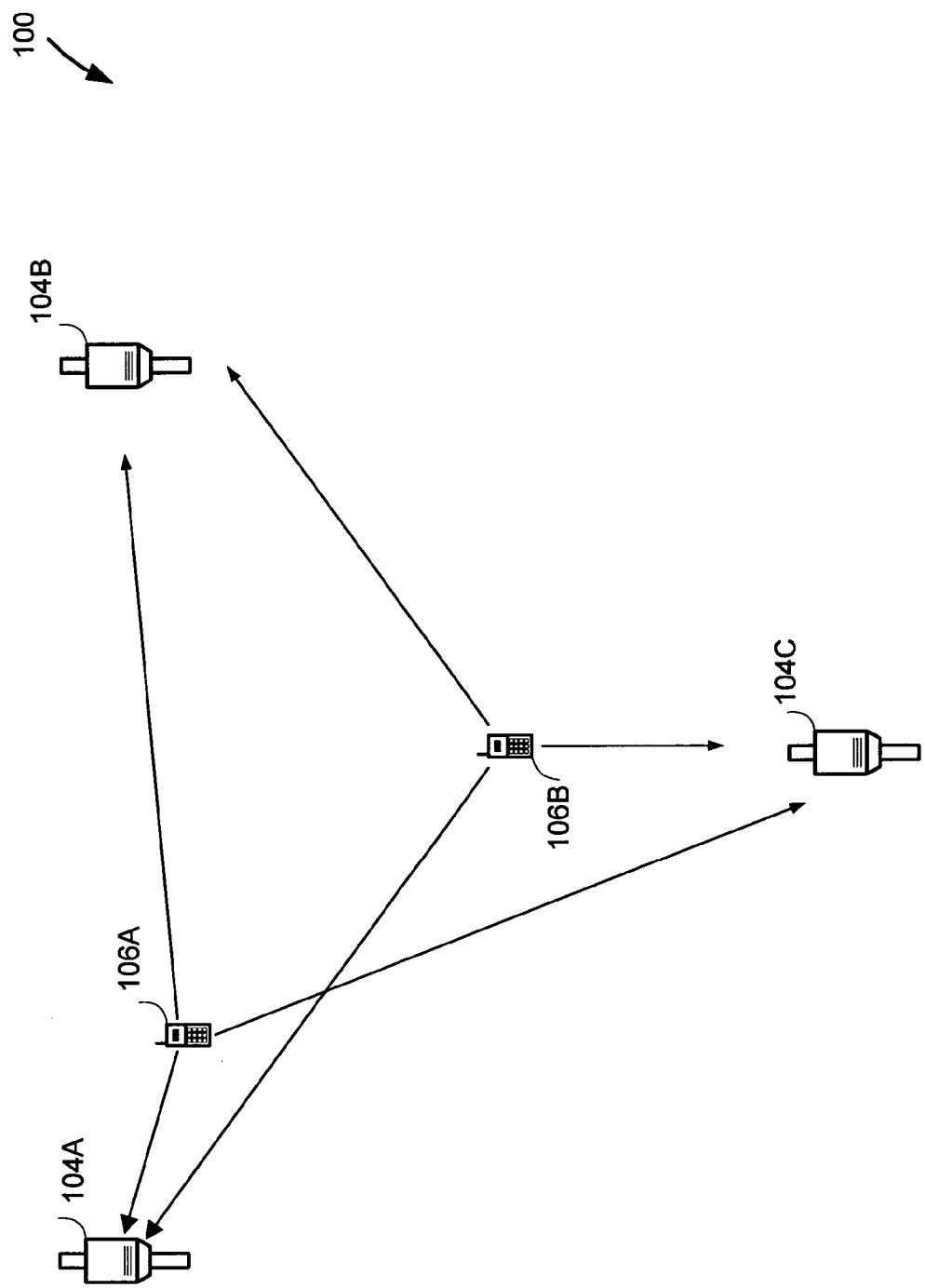
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms User Equipment (UE), subscriber unit, subscriber station, Access Terminal (AT), remote terminal, or other corresponding terms known in the art. The term mobile station is applicable to any of these wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station 106 is in soft handoff. The forward link (i.e., downlink) refers to transmission from the base station to the mobile station, and the reverse link (i.e., uplink) refers to transmission from the mobile station to the base station.

For clarity, the examples used herein assume the base station is the originator of signals, and the mobile station(s) are receiver(s) and acquirer(s) of those signals, i.e. signals on the forward link. Those skilled in the art will understand that mobile stations as well as base stations can be equipped to transmit data as described herein and therefore, these examples are also applicable to the reverse link. The word "exemplary" is used exclusively herein to mean "serving as an example, instance, or illustration." Any embodiment described herein as "exemplary" is not necessarily to be construed as preferred or advantageous over other embodiments.

Figure 2:
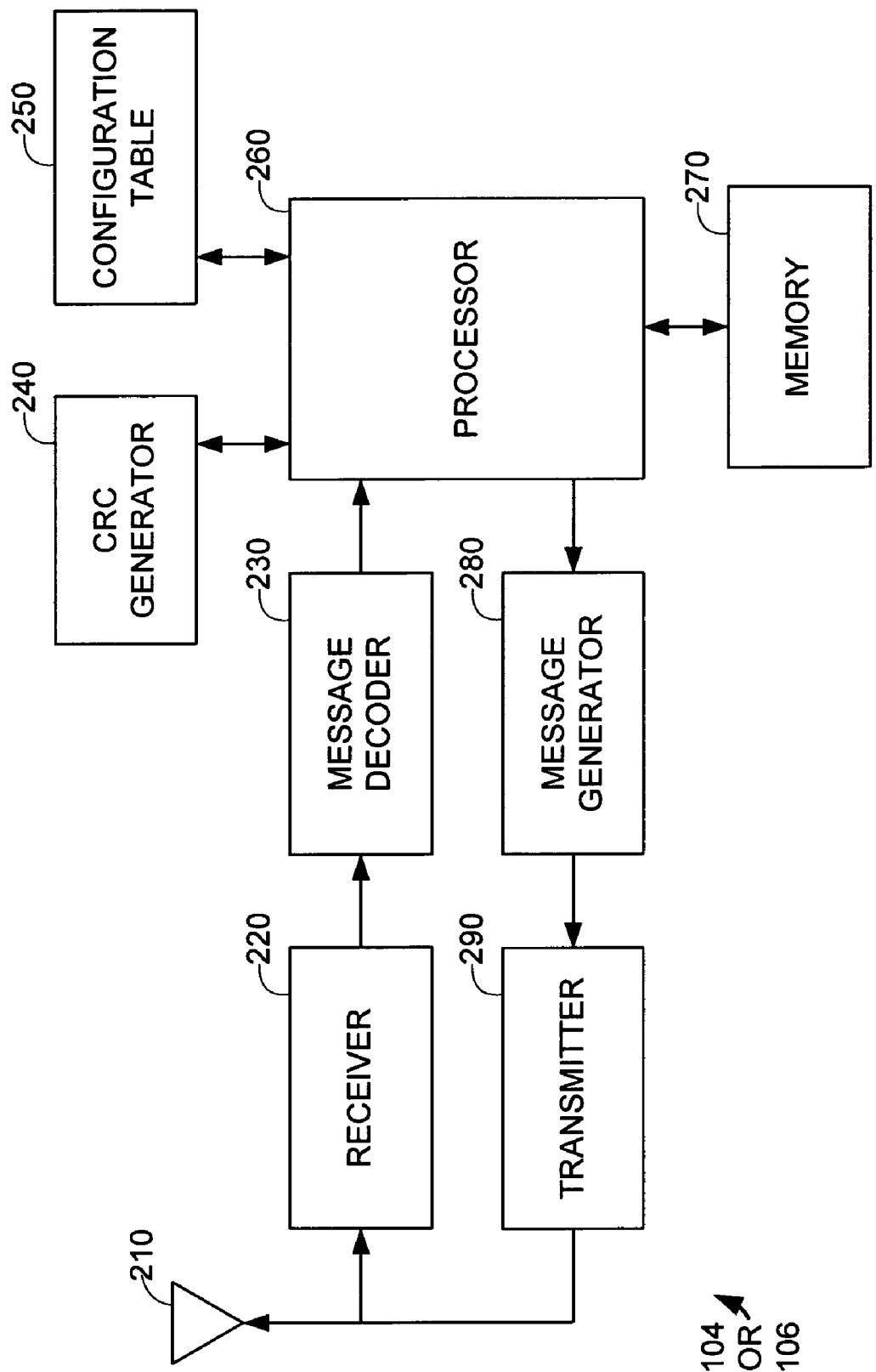
FIG. 2 is a portion of a base station or mobile station equipped for synchronization of stored service parameters.

FIG. 2 depicts an embodiment of a communication device which can be configured as a base station 104 or a mobile station 106. Various embodiments, examples of which are detailed below, may call for only a subset of the components shown in FIG. 2 in either the base station 104 or mobile station 106.

Signals are received at antenna 210 and delivered for conversion from radio frequency (RF) to baseband, amplification, filtering, demodulation, decoding, and the like in receiver 220, techniques for which are known in the art. Note that any air interface can be supported, and the format of transmission on the forward and reverse links need not be identical. Message decoder 230 receives demodulated data from receiver 220 and decodes messages incorporated in the data for delivery to processor 260. Examples of messages received include, but are not limited to, Origination or Page Response Messages received at a base station, Paging Messages received at a mobile station 106, parameter negotiation messages received at either type of station, messages containing SYNC_ID, and the like.

Processor 260 may be a Digital Signal Processor (DSP), a specialized processor for performing communication tasks, or any general purpose processor known in the art. Processor 260 is coupled with memory 270, which can store instructions for performing the various steps and processes disclosed herein, and detailed further below.

Depending on the embodiment employed, processor 260 may deliver data to CRC generator 240 for generating a CRC over information and parameters received in various messages from message decoder 230, or stored in memory 270 as configuration for use in communication. Some embodiments may include configuration table 250, which includes configurations, or sets of parameters, and a unique identifier for each possible configuration.

A base station 104 may store a configuration for each of a plurality of mobile stations 106 with which it is communicating. The configurations can be stored in memory 270. In some embodiments, when configuration table 250 is employed, the base station 104 may only need to store the configuration identifiers associated with the various mobile stations 106. A mobile station 106 may only store one configuration, the one most recently used. Alternate embodiments may allow the mobile station 106 to store multiple configurations. In some embodiments, the base stations 104 may contain configuration tables 250, while the mobile stations 106 do not. Alternatively, a mobile station 106 may also contain configuration table 250.

Message generator 280 generates messages under control of processor 260 for delivery to transmitter 290. Some example messages have been described above. Transmitter 290 performs encoding, modulation, amplification, filtering, up-conversion to RF, and the like, techniques for which are known in the art, and delivery to antenna 210 for transmission.

Those of skill in the art will recognize that the various components shown in FIG. 2 are subsets of the components typically employed in a mobile station 106 or base station 104. Furthermore, the functional divisions are shown for clarity of discussion, as the various components may be discrete special purpose hardware, or implemented in firmware or software and carried out as instructions in processor 260, or a combination thereof. Configuration table 250 may reside in memory 270. Memory 270 may be a component of processor 260.

Figure 3:
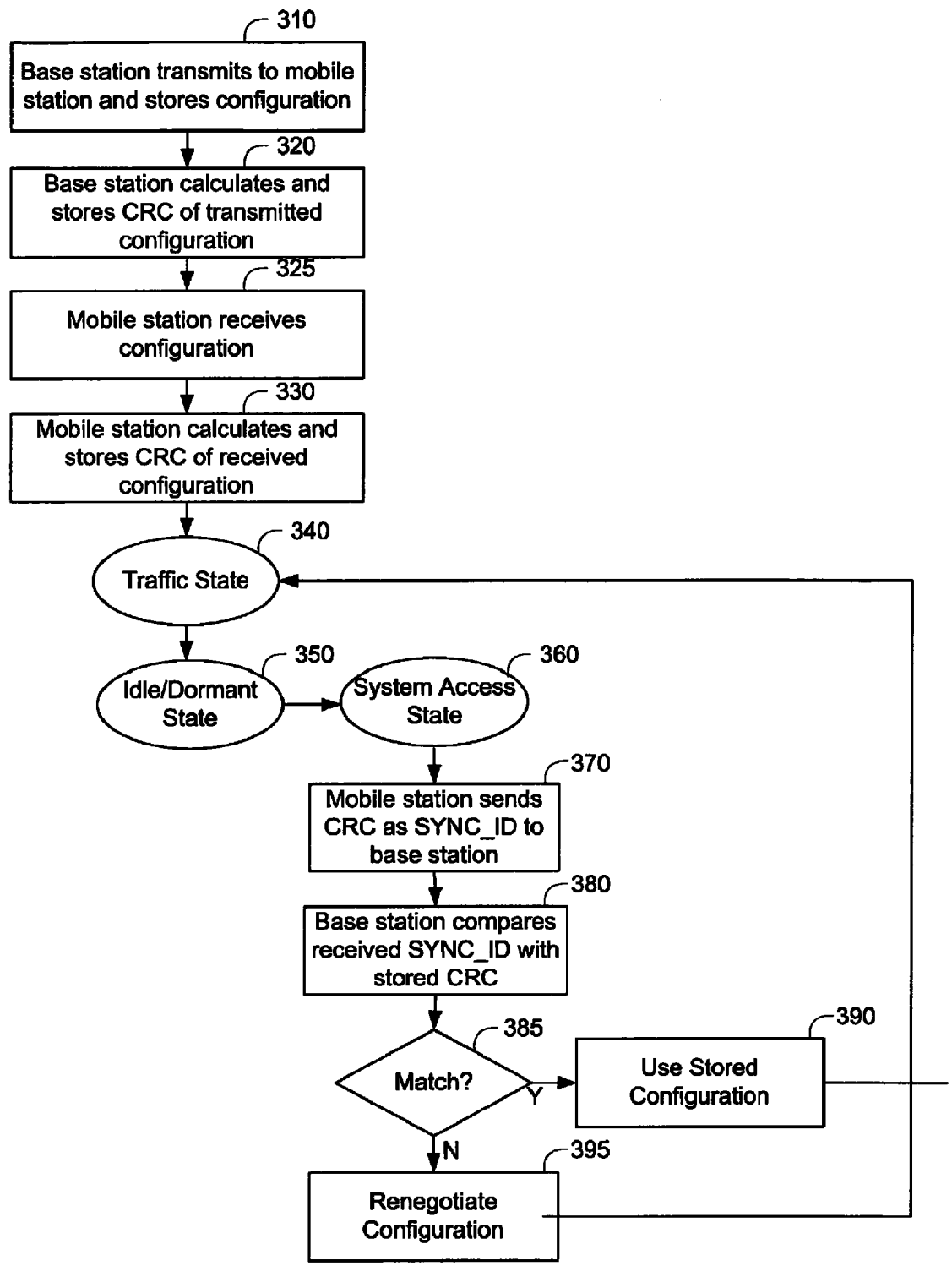
FIG. 3 is a flow diagram of an embodiment of stored service parameter synchronization using CRCs as exemplary identifiers.

FIG. 3 depicts a flowchart of an embodiment of a method for stored configuration synchronization, suitable for use with base stations 104 and mobile stations 106, described above with respect to FIG. 2. In step 310, the base station 104 stores a configuration and transmits that configuration to the mobile station 106. The storing and transmitting in step 310 may occur during a negotiation of the parameters in the configuration with the mobile station 106. In step 320, the base station 104 computes and stores a CRC of the transmitted configuration. In step 325, the mobile station 106, having received the transmitted configuration, stores it for use in current communication and for potential future use. In step 330, the mobile station 106 calculates and stores a CRC of the configuration. The mobile station 106 then enters the traffic state 340, and communication transpires. When a voice call is terminated, or a data session goes dormant, the idle state 350 is entered. At some point, after being paged by the base station 104 or when originating a new voice call or reactivating a data session, the mobile station 106 enters the system access state 360, with the goal of re-entering traffic state 340 and re-establishing communication. Steps 370-395 indicate one embodiment of re-establishing synchronized stored service parameters. While these steps are carried out, the mobile station 106 may be in either the system access state, the traffic state, or in transition between the two. The details of state transition will be specified by whichever standard is adhered to, and do not limit the scope of the present invention. In step 370, the mobile station 106 sends the CRC as a SYNC_ID to the base station 104. In step 380, the base station 104 compares the received SYNC_ID with the CRC stored in the base station 104. If there is a match, in decision block 385, proceed to step 390 and use the stored configuration for the communication session, which begins when the mobile station 106 transitions back to the traffic state 340.

If there is no match, in decision block 385, then the base station 104 and mobile station 106 must renegotiate the configuration in step 395, before traffic state 350 is entered. There are a number of reasons for a failed match. The base station 104 may have had to flush the portion of its memory containing the configuration for the particular mobile station 106. Or, the mobile station 106 may have roamed and is communicating with new base station. Roaming issues may differ depending on the embodiment employed, and are discussed further below with respect to FIG. 8.

Note that the calculation of the CRC in the base and mobile stations 106 need not occur in the order shown. It is sufficient that the CRC is calculated in the mobile station 106 before it is transmitted, and in the base station 104 before it is compared. Storing the CRC in either station can be omitted if the CRC is regenerated each time it is used. However, if a configuration is used repeatedly, as may occur with a data session that transitions between active and dormant states frequently, it may be desirable to calculate the CRC once.

Figure 4:
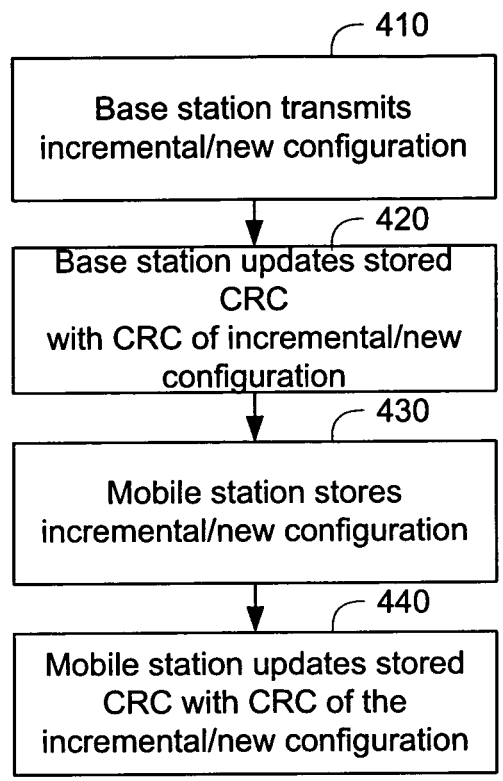
FIG. 4 is a flow diagram of a modification to the embodiment of FIG. 3 for mitigating the effects of differing service parameter storage techniques on identifier generation.

If the configuration information is stored differently in the base station 104 and the mobile station 106, whether during or subsequent to negotiation, then a CRC calculated on the two configurations is likely to be different, even though the information contained is the same. This is because the output of a CRC generator, such as CRC generator 240, is dependent on the order in which it receives data. FIG. 4 depicts a flowchart of a modification that can be introduced to the process described in FIG. 3 to produce an embodiment that provides for configuration synchronization without regard for how the configuration is stored in the mobile and base station 104.

In step 410, the base station 104 transmits incremental or new configuration information. This may occur during initial service parameter negotiation. It may also occur after the mobile station 106 has entered the dormant state following a communication session, i.e., after entering state 350 of FIG. 3. In step 420, the base station 104 calculates a CRC on the incremental or new configuration information, as transmitted, and updates the stored CRC with the new CRC calculation. There are myriad ways of combining CRCs, all of which fall within the scope of the present invention. One example is to exclusive OR the new CRC with the stored CRC. If there is no stored CRC, because the new or incremental information was the initial information, the new CRC can be simply stored.

In step 430, the mobile station 106 receives and stores the incremental or new configuration information. In step 440, the mobile station 106 calculates the CRC of the new or incremental configuration information, as received, and combines that CRC with a stored CRC, if one exists, and stores the result as the current stored CRC. Note that, in steps 420 and 440, the base station 104 or mobile station 106, respectively, performs the CRC on the transmitted information. Therefore, the method of storing the information in either the base or mobile station 106 does not affect the resultant CRC. The CRC combination technique will produce the same result as the base station 104 combining in step 420. Subsequently, the mobile station 106 can enter the traffic state 340 to begin communication with the base station 104, and the process continues as described in FIG. 3 with respect to steps 340 through 395.

It can be seen that by modifying the process of FIG. 3 with the steps just described, differing methods for storing the service parameters in the base station 104 and mobile stations 106 will not interfere with synchronization of the configurations. The procedure of FIG. 4 can be used for the initial service configuration negotiation, with incremental CRC calculations and subsequent CRC combining procedures, as necessary. Then, subsequent or incremental changes made to the service configuration can also be updated according to the procedure, thus maintaining the configuration synchronization procedure independently from the configuration storage procedure.

Note also that the CRC, as used throughout this description, is only one example of a function for generating an identifier associated with a configuration. Other functions are known to create an identifier for data based on the data's contents and can also be used within the scope of the present invention. Examples include hash functions, digital signatures, and the like.

Figure 5:
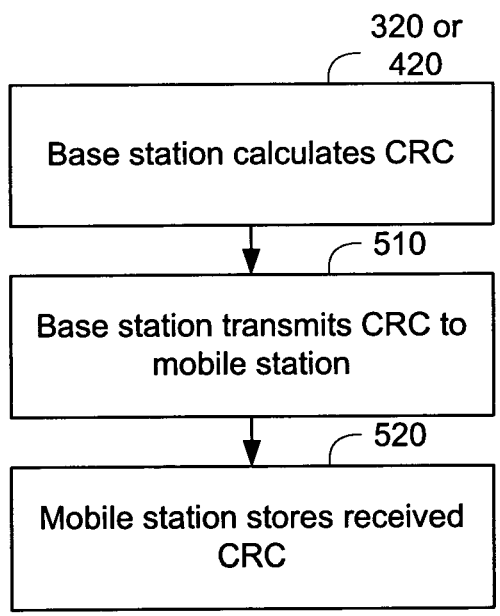
FIG. 5 is a flow diagram of a modification to the embodiments of FIG. 3 or FIG. 4 for eliminating the need for identifier generation in a mobile station.

In some embodiments, it may be desirable to minimize the computation required in the mobile station 106 to carry out parameter synchronization. The methods depicted in FIGS. 3 and 4 can be modified so that the mobile station 106 need not calculate the CRC (or other identifier-generating function). An exemplary embodiment of such a method is depicted in FIG. 5. This method also mitigates the effects of storage techniques differing between base stations 104 and mobile stations 106. The base station 104 calculates the CRC in step 320 or 410, depending on whether the process of FIG. 3 or FIG. 4 is being modified, respectively. In step 510, the base station 104 transmits the CRC to the mobile station 106. The mobile station 106 receives the CRC and stores it in step 520. Note that, with this modification, step 330 of FIG. 3 and step 440 of FIG. 4, where the mobile station 106 computed the CRC (or other identifier-generating function), are not needed.

Figure 6:
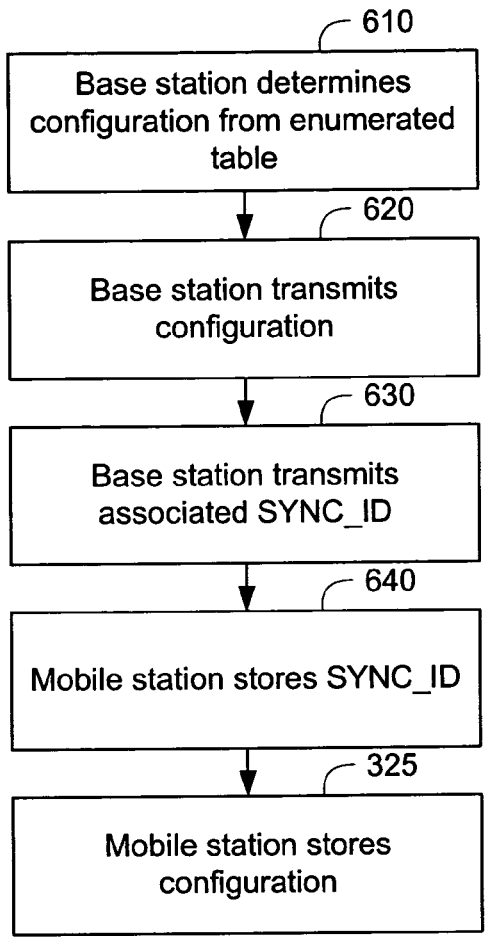
FIG. 6 is a flow diagram of an embodiment of stored service parameter synchronization using configuration tables.

FIG. 6 depicts a flowchart of an embodiment that eliminates the need for the base station 104 and the mobile station 106 to calculate an identifier, such as a CRC. In step 610, the base station 104 determines the configuration from an enumerated table. As described above, the number of stored service parameters may be quite large. The resultant number of possible configurations may be exceedingly large for practical storage in a table. However, many of the parameters are not independent, and therefore many settings are not possible with certain other settings. In some embodiments, it may be reasonable to enumerate the supported configurations in a configuration table, such as configuration table 250 in FIG. 2.

Each configuration in the configuration table is associated with an identifier, which can be used as the SYNC_ID. The identifier may be an index, a CRC, a random number, or any other function of the configuration data. Simply using an index may not be desirable if it is possible that neighboring systems may use different enumeration tables. In such a case, a mobile station 106 may respond with a SYNC_ID containing an index, and the associated configuration in the configuration table will not be synchronized with the stored configuration at the mobile station 106. A random number is more likely to provide protection, if it is unlikely that neighboring base stations will use the same random numbers for different configurations. A CRC, or other function of the configuration data, may be the most robust for certain circumstances. In step 620, the base station 104 transmits the configuration to the mobile station 106. In step 630, the base station 104 transmits the identifier associated with the configuration. The mobile station 106 receives and stores the identifier, or SYNC_ID, in step 640. The process can then proceed as described in FIG. 3.

The mobile station 106 receives and stores the configuration in step 325. No calculation is required by the mobile station 106, so step 330 is not needed. The mobile station 106 can proceed to the traffic state 340 and commence communication. When the mobile station 106 attempts to use the stored service configuration for reestablishing a call (subsequent to states 350 and 360), the mobile station 106 will send the SYNC_ID received in step 370. It may be a CRC, but it may also be one of the other examples given above. The base station 104 compares the SYNC_ID with the identifier stored for that mobile station 106 in step 380. Again, the identifier may be a CRC or any of the other identifiers given above. If there is a match, in decision block 385, the mobile station 106 will use the stored configuration, and the base station 104 will use the configuration associated with the identifier in the configuration table. If there is not a match, the mobile station 106 and base station 104 will need to renegotiate the configuration in step 395.

Figure 7:
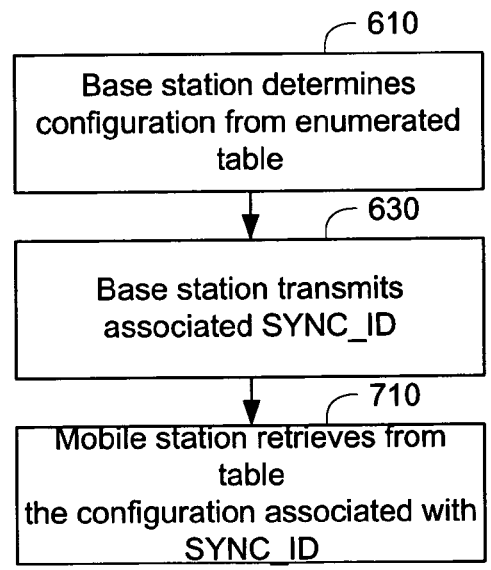
FIG. 7 is a flow diagram of a modification to the embodiment of FIG. 6 for supporting configuration tables in mobile stations.

Yet another simplification can be made if the configuration table, such as configuration table 250, is stored in the mobile station 106. The procedure just described with respect to FIG. 6 can be modified as shown in FIG. 7. As before, the base station 104 determines the configuration from a configuration table and determines the identifier with which it is associated. The base station 104 sends the identifier, or SYNC_ID, in step 630. Step 620, the base station 104 sending the configuration is not necessary. Rather, the mobile station 106 retrieves from its configuration table the configuration associated with the received SYNC_ID, shown in step 710. The mobile station 106 will naturally maintain a record of the SYNC_ID (step 640), not shown in FIG. 7. The process then proceeds according to FIG. 3, as described above with respect to FIG. 6.

Note that the configuration table in the mobile station 106 need not contain the entire list of records as the configuration table in the base station 104. What is important is that the identifiers associated with configurations in the mobile station's configuration table match the corresponding identifiers and configurations in the base station's configuration table. The base station 104 can send the configuration to the mobile station 106 when one that is not supported in the mobile station's configuration table is required (using the method described above in FIG. 6).

The procedure described in FIG. 7 has the benefits of requiring neither the base station 104 nor the mobile to compute an identifier for a configuration, and the configuration need not be transmitted over the air.

The various embodiments for synchronizing stored service parameters are designed with mobile station 106 roaming in mind. If a mobile station 106 never roamed, communicating with only a single base station 104, a SYNC_ID may be redundant, since the mobile station 106 could simply identify whether or not the latest configuration was still available. A single bit would suffice. The base station 104 could simply agree to use the stored configuration if it still had the mobile's configuration stored. In reality, mobile stations roam, which is why the various embodiments, described above, were outfitted with various techniques for ensuring that when the mobile station 106 attempts to reconnect to a base station 104, and use a stored configuration, the configuration is the same at both the mobile station 106 and the base station 104. The system can make the stored configuration for various mobile stations 106 available to neighboring base stations 104 by transmitting them on the backhaul (the network interconnecting base stations, base station controllers, mobile switching centers (MSCs), and the like). Or, as described above with respect to FIGS. 6 and 7, the base stations 104 may contain configuration tables. The techniques described in FIGS. 6 and 7 work with roaming mobile stations 106 so long as the base stations 104 contain the same configuration tables. The above-described techniques also work well when neighboring base stations, while not equipped with identical configuration tables or the current settings for roaming mobiles, will reject requests for using stored configurations when not so equipped.

A network operator may choose to employ base stations 104 in its network, or in sub-parts of its network, which all adhere to a certain method for stored service parameter synchronization. Neighboring systems, perhaps run by different network operators, may have roaming agreements which allow roaming, but may not adhere to a common stored service parameter synchronization protocol. When a mobile roams from one system, using a certain protocol, to another system using an incompatible protocol, or the protocol is unknown, the mobile station 106 may need to disable the SYNC_ID method it is using.

Figure 8:
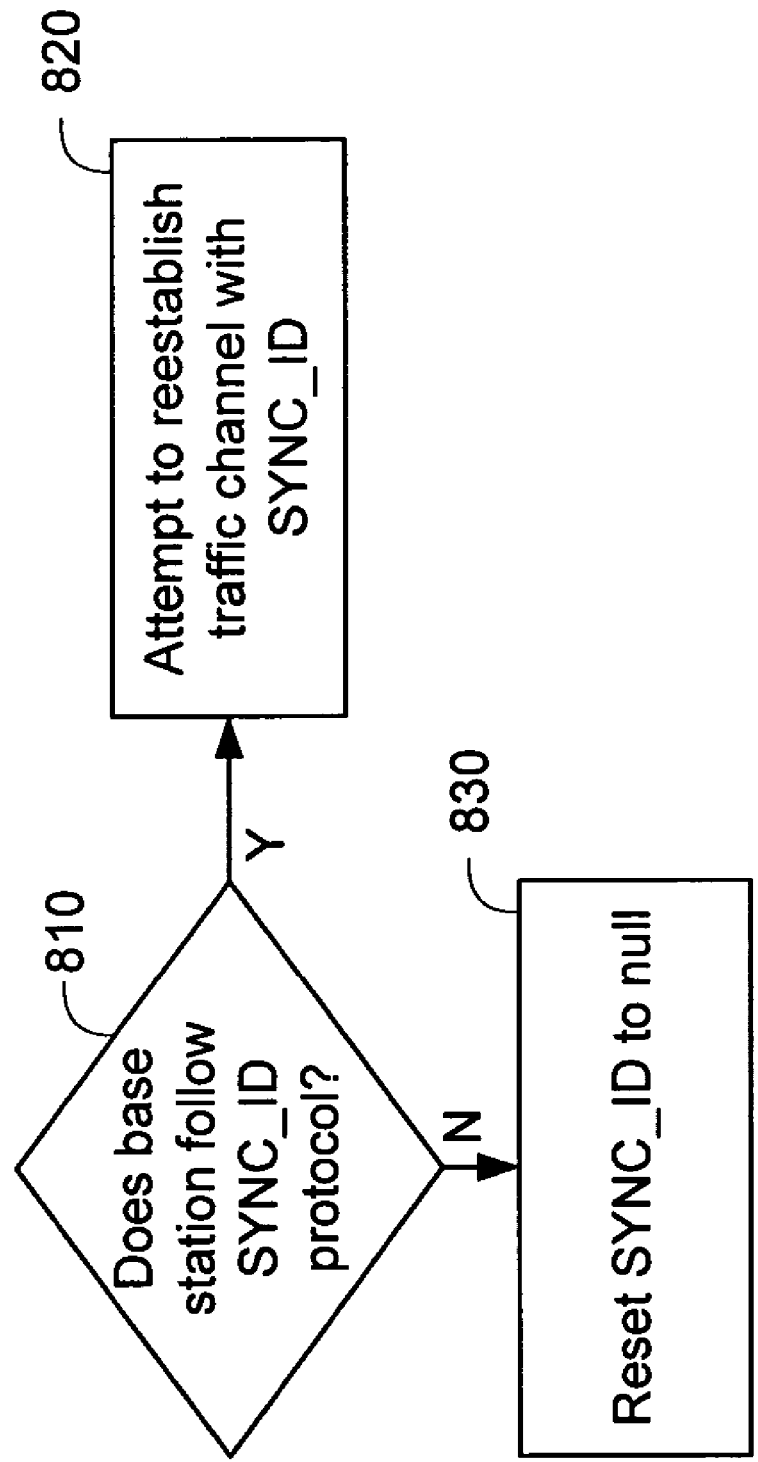
FIG. 8 is a flow diagram of an embodiment of a method for stored service parameter synchronization while roaming.

FIG. 8 shows a flowchart of a method a mobile station 106 may employ when it is roaming into a new system, or sub-part of a system. In decision block 810, the mobile station 106 determines if the base station 104 it is roaming to follows the SYNC_ID protocol used for storing its current configuration. There are a variety of ways for a mobile station 106 to determine this. Various networks contain system identifications (SIDs) and network identifications (NIDs). The mobile station 106 may simply assume, when roaming to a new SID or NID, that the protocol is different. Or the mobile station 106 may know in advance a list of systems which adhere to one protocol or another. The various protocols may be differentiated on systems of different frequencies or geographical regions. Clearly, when a mobile station 106 roams into a system using a different air interface, the stored service parameters may need to be updated with parameters suited to the alternate air interface. As stated above, if the base station 104 uses a protocol, such as CRC checking, that will reject the offer to use the stored configuration when it is invalid, the mobile station 106 need not take any action, but can attempt to reestablish a traffic channel using the stored identifier, such as SYNC_ID, as shown in step 820.

In decision block 810, if the base station 104 does not follow a protocol that is the same or at least compatible with the mobile station's currently stored SYNC_ID, or the base station's protocol is unknown, the mobile station 106 may proceed to step 830 and reset SYNC_ID to a null value. This will ensure that the service parameters will be renegotiated. In an alternative embodiment, the messages between the mobile station 106 and base station 104 may allow the mobile station 106 to signify that the stored configuration is not valid, such as the Origination Message or Page Response Message. Or, the base station 104 may know that an entering mobile station 106 does not have a valid stored configuration, and thus to ignore the SYNC_ID.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, aDSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), FLASH memory, Read-Only Memory (ROM), Erasable Programmable ROM (EPROM), Electrically Erasable Programmable Memory (EEPROM), registers, hard disk, a removable disk, a Compact Disc-ROM (CD-ROM), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile station that is configured to synchronize a first stored configuration with a second stored configuration within a base station, the mobile station comprising:
   a processor;
   memory in electronic communication with the processor; and
   instructions stored in the memory, the instructions being executable to:
      receive a configuration from the base station, wherein the received configuration is stored, and wherein the configuration comprises service parameters associated with the establishment of communications with the base station:
      calculate a first identifier for the configuration, wherein the first identifier is stored;
      enter a first traffic state with the base station using the configuration;
      transmit the first identifier for the configuration to the base station, wherein the first identifier is transmitted after the termination of the first traffic state and wherein the first identifier is compared with a second identifier stored at the base station; and
      use the configuration to enter a second traffic state with the base station if the first identifier and the second identifier match.

2. The mobile station of claim 1, wherein the instructions are further executable to receive a partial configuration from the base station, wherein the partial configuration is a subset of the configuration.

3. The mobile station of claim 2, wherein the instructions are further executable to calculate a third identifier for the partial configuration.

4. The mobile station of claim 3, wherein the instructions are further executable to combine the third identifier with the first identifier to update the first identifier.

5. The mobile station of claim 1, wherein the first identifier is a Cyclic Redundancy Check (CRC).

6. A mobile station that is configured to synchronize a first stored configuration with a second stored configuration within a base station, the mobile station comprising:
   means for receiving a configuration from the base station, wherein the received configuration is stored, and wherein the configuration comprises service parameters associated with the establishment of communications with the base station;
   means for calculating a first identifier for the configuration, wherein the first identifier is stored;
   means for entering a first traffic state with the base station using the configuration;
   means for transmitting the first identifier for the configuration to the base station, wherein the first identifier is transmitted after the termination of the first traffic state and wherein the first identifier is compared with a second identifier stored at the base station; and
   means for using the configuration to enter a second traffic state with the base station if the first identifier and the second identifier match.

7. A computer readable medium having instructions thereon, the instructions comprising:
   code for receiving a configuration from the base station, wherein the received configuration is stored, and wherein the configuration comprises service parameters associated with the establishment of communications with the base station;
   code for calculating a first identifier for the configuration, wherein the first identifier is stored;
   code for entering a first traffic state with the base station using the configuration;
   code for transmitting the first identifier for the configuration to the base station, wherein the first identifier is transmitted after the termination of the first traffic state and wherein the first identifier is compared with a second identifier stored at the base station; and
   code for using the configuration to enter a second traffic state with the base station if the first identifier and the second identifier match.

8. The mobile station of claim 6 further comprising means for receiving a partial configuration from the base station, wherein the partial configuration is a subset of the configuration.

9. The mobile station of claim 8 further comprising means for calculating a third identifier for the partial configuration.

10. The mobile station of claim 9 further comprising means for combining the third identifier with the first identifier to update the first identifier.

11. The mobile station of claim 10 wherein the first identifier is a Cyclic Redundancy Check (CRC).

* * * * *